No. 738,293. PATENTED SEPT. 8, 1903.
C. A. CHAPMAN.
STARTING APPARATUS FOR RACES.
APPLICATION FILED MAY 14, 1902.
NO MODEL. 4 SHEETS—SHEET 1.
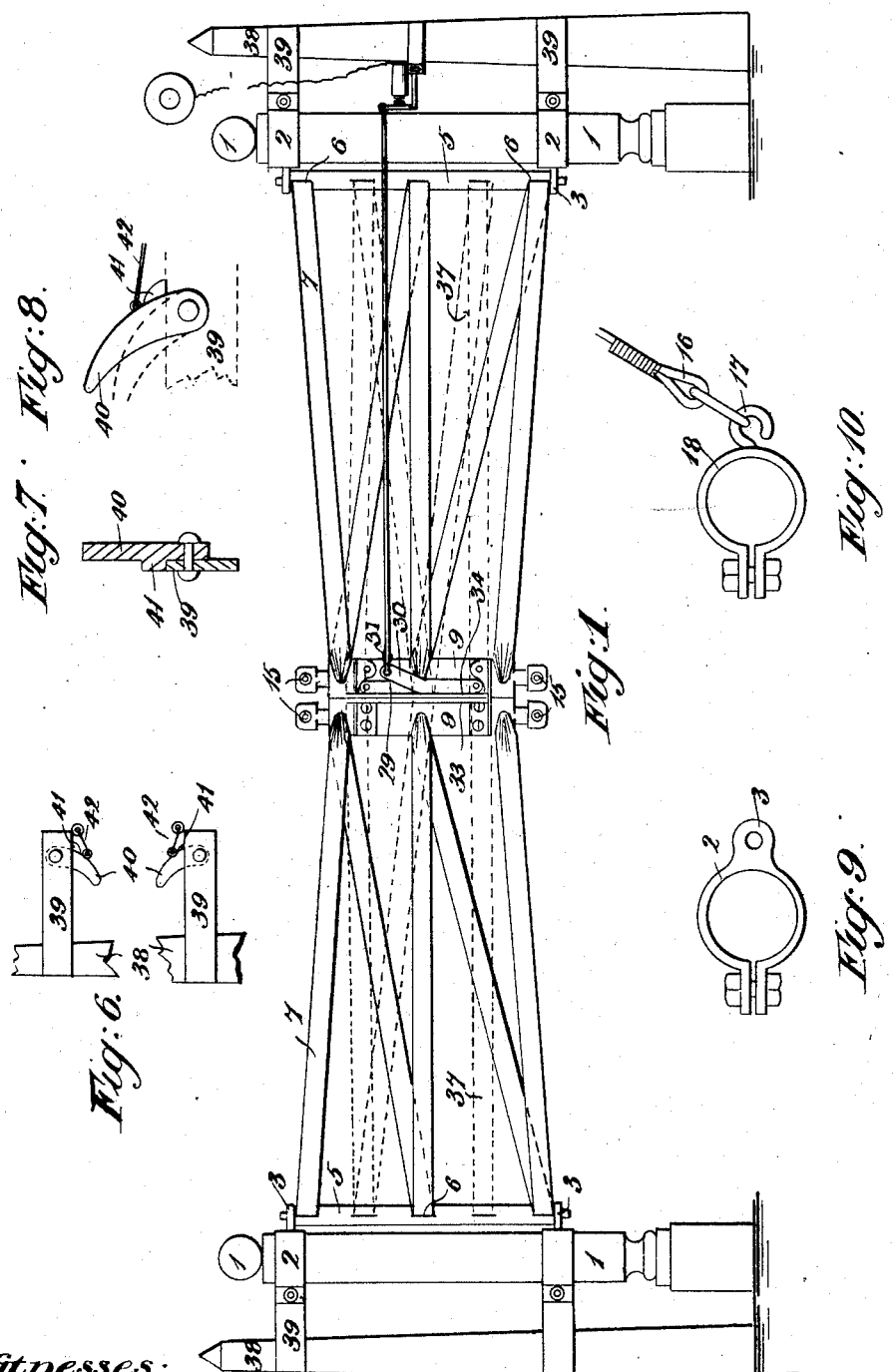
Witnesses:
Robert Head
N. C. Abbott
Inventor:
Charles Arthur Chapman,
By his Attorney,
F. N. Richards.

No. 738,293. PATENTED SEPT. 8, 1903.
C. A. CHAPMAN.
STARTING APPARATUS FOR RACES.
APPLICATION FILED MAY 14, 1902.
NO MODEL. 4 SHEETS—SHEET 2.
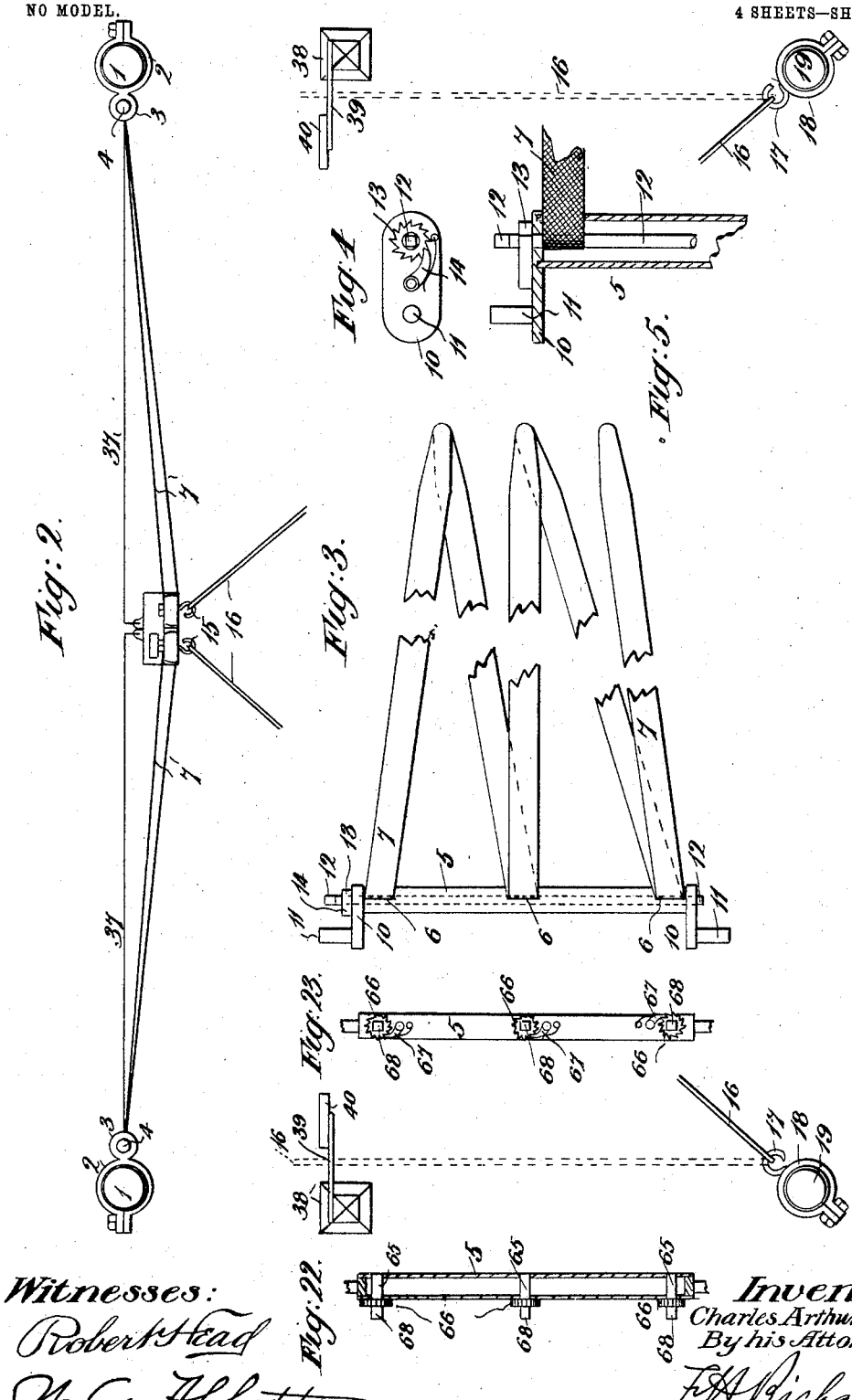
Witnesses:
Robert Head
H. C. Abbott
Inventor:
Charles Arthur Chapman
By his Attorney,
F. H. Richards.

No. 738,293. PATENTED SEPT. 8, 1903.
C. A. CHAPMAN.
STARTING APPARATUS FOR RACES.
APPLICATION FILED MAY 14, 1902.
NO MODEL. 4 SHEETS—SHEET 3.

Witnesses:
Robert Head
H. C. Abbott

Inventor:
Charles Arthur Chapman,
By his Attorney,
J. H. Richards.

No. 738,293. PATENTED SEPT. 8, 1903.
C. A. CHAPMAN.
STARTING APPARATUS FOR RACES.
APPLICATION FILED MAY 14, 1902.
NO MODEL. 4 SHEETS—SHEET 4.
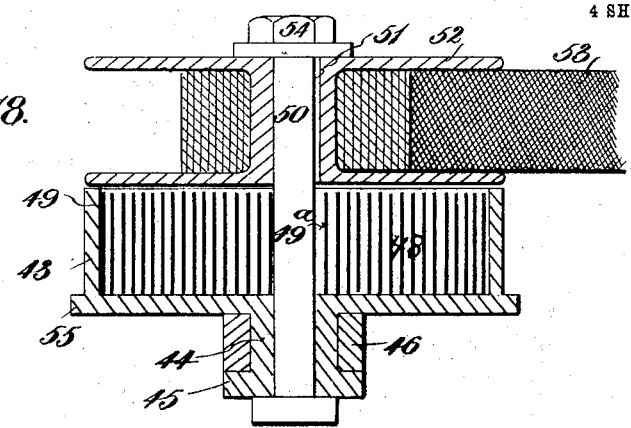
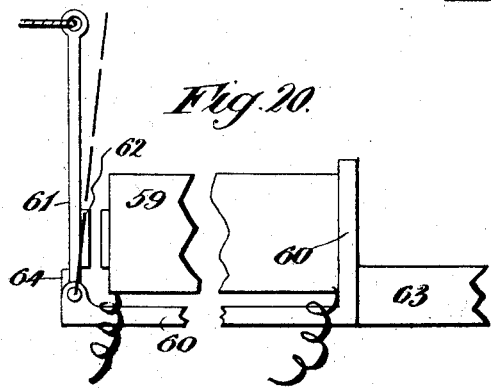
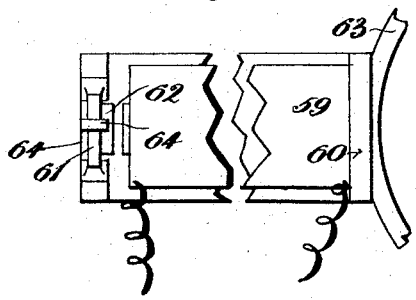
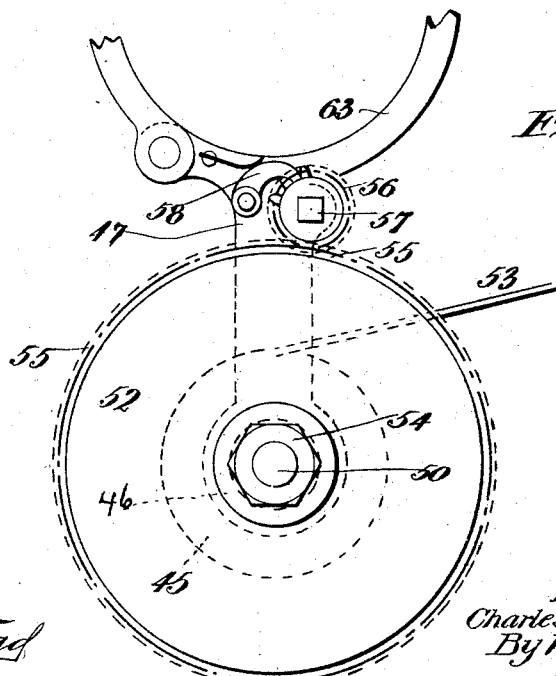
Witnesses:
Robert Head
A. C. Abbott
Inventor:
Charles Arthur Chapman
By his Attorney,
F. H. Richards.

No. 738,293. Patented September 8, 1903.

UNITED STATES PATENT OFFICE.

CHARLES ARTHUR CHAPMAN, OF HORLEY, ENGLAND.

STARTING APPARATUS FOR RACES.

SPECIFICATION forming part of Letters Patent No. 738,293, dated September 8, 1903.

Application filed May 14, 1902. Serial No. 107,235. (No model.)

*To all whom it may concern:*

Be it known that I, CHARLES ARTHUR CHAPMAN, gentleman, a subject of the King of Great Britain and Ireland, residing at Glenthorne, Horley, Surrey, England, have invented certain new and useful Improvements in Starting Apparatus for Races, of which the following is a specification.

This invention relates to apparatus for starting races, and is preferably in the form of a gate adapted to be instantaneously swung out of the way at will.

The objects are to cause instantaneous operation, preferably through the instrumentality of electric currents; to render the gates adjustable to various widths of courses; to maintain the gates parallel with the course when open, and to produce an inexpensive and durable structure.

Figure 11:
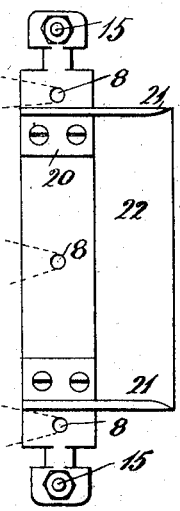
Figure 12:
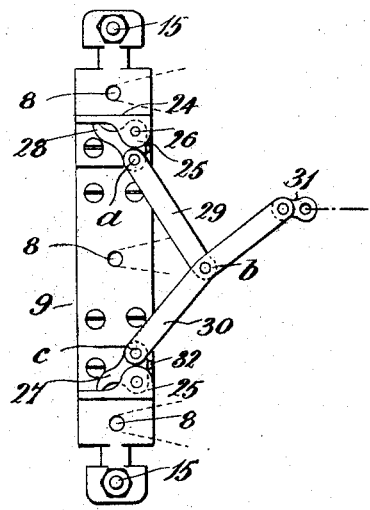
Figure 13:
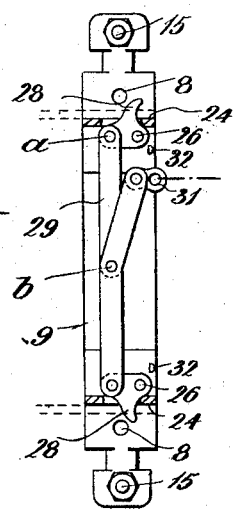
Figure 14:
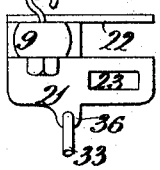
Figure 15:
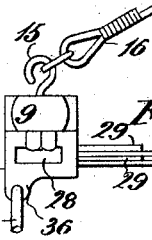
Figures 16, 17:
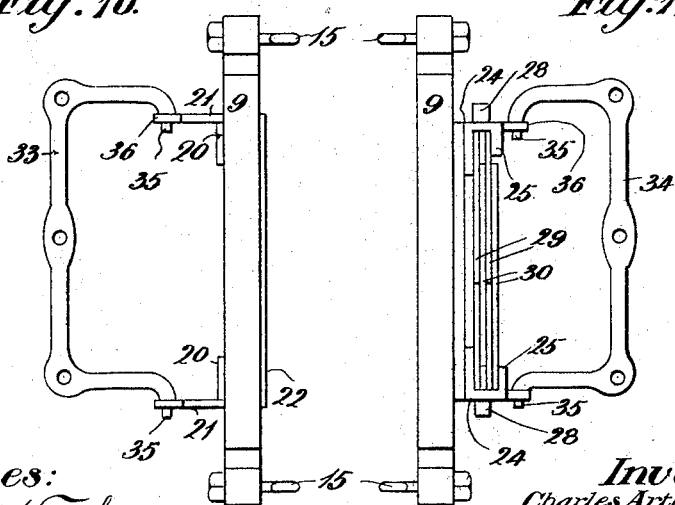

Referring to the drawings forming part of this specification, Figure 1 is a front elevational view of the device when in position to close the course. Fig. 2 is a plan of same. Fig. 3 is a view to an enlarged scale, showing a method of stringing the tapes. Figs. 4 and 5 are respectively a plan and sectional view of an arrangement whereby the length of the tapes or the like may be adjusted. Fig. 6 is a side view illustrating the means employed for preventing the rebound of the device when same is released to open the course. Figs. 7 and 8 are respectively a section and side elevation, to an enlarged scale, of part of the means illustrated in Fig. 6. Fig. 9 is a plan of one of the collars for supporting the inner end pieces of the device. Fig. 10 is a plan of one of the collars to which are secured the ends of the operating-springs. Fig. 11 illustrates one of the stiles of the gate equipped with hasps for the locking device. Fig. 12 illustrates said stile provided with the locking device in an unlocked position. Fig. 13 is a similar view showing said device in a locked position. Figs. 14 and 15 are top plan views of said stiles and the elements carried thereby. Figs. 16 and 17 are transverse elevational views of said stile, showing the means whereby the struts are fastened to the gate. Fig. 18 is a transverse section, to an enlarged scale, of an alternative form of spring for actuating the gates. Fig. 19 is a plan of same. Fig. 20 is a side elevational view of an electromagnetic means for actuating the cord of the locking device. Fig. 21 is a plan of the same. Fig. 22 is a longitudinal section showing an alternative form of adjustment for the tapes. Fig. 23 is an elevational view of same.

Referring to the drawings, 1 1 are posts to which are adjustably secured the split collars 2, each provided with an eye 3, adapted to receive the projecting ends of the spindle 4, passing through the piece 5, which piece in the present instance is formed of a length of tube slotted at 6 for the passage therethrough of the flexible tapes, bands, or belts 7.

The bands 7, which with their inner and outer stiles are hereinafter referred to as "gates," are arranged as shown in Figs. 1, 2, and 3, one end being attached to the upper end of spindle 4 and then passed through the slot in the tube 5 and from there threaded through the holes 8 in the vertical end bar 9 and the slots in the tube 5 in the manner illustrated by the figures above referred to. Where it is desired to employ the device for a number of courses or tracks of varying widths, it is necessary that provision should be made whereby the length of the tapes may be adjusted to suit same, and this I may effect by means of the arrangement illustrated by Figs. 4 and 5. Referring to said figures, 10 is a plate having cast or otherwise secured thereto a pin 11, which takes into the eyes 3 when the member 10 is employed. The plate is perforated at its outer end, and through the perforation passes the vertical spindle 4, the upper end 12 of which is squared, so that by means of a suitable key the spindle may be rotated. 13 is a ratchet-wheel secured to the upper end of the spindle and with which engages the spring-governed pawl 14. Two plates 10 are provided, each of which is recessed upon its under or upper surface, respectively, to receive the end of the tube 5 secured therein, which, as in the preceding case, is slotted for the introduction of the tape 7. By means of the above arrangement the length of the tape may be easily and readily adjusted by coiling the same upon or unwinding it from off the spindle 4, the tension being also regulated thereby, so as to keep the tapes from sagging under the weight of the end piece 9. It is obvious that instead of employing a length of tape and stringing the same in the manner described separate lengths of tape may be employed, each secured, respectively, at the inner and outer ends to the spindles 4 and the end piece 9. The end piece 9 may be formed of wood, metal, or other material of any suitable section, but in the present instance is of wood of rectangular section with holes 8, through which, as aforesaid, pass the tapes 7. The piece 9 is at its upper and lower ends provided with an eyebolt or the like 15, to each of which is secured the end of a spring 16, formed of india-rubber, which may be covered with a suitable protective covering. The opposite ends of the springs 16 are attached to the hook 17, secured to the split collars 18, clamped around the posts 19, arranged at a suitable distance upon the side of the track. The construction of the two gates being identical up to this point, it will be understood that the preceding description applies to both.

Secured to the end bar upon the left-hand gate, Figs. 1, 2, 11, 14, and 16, are inverted-L-shaped plates, the vertical members 20 of which are of a width equal to that of the face of the bar to which they are secured and the horizontal portion 21 approximately twice this. A plate 22 is secured upon the opposite face of the bar. Openings 23 are formed in the horizontal portions 21, such openings when the two bars are brought together coinciding with openings formed in the plates 24, secured to the bar of the opposite gate. The plates 24 have formed upon their horizontal members vertical pieces 25, which in conjunction with the back portions of the plate form a support for the pins 26. Revolubly mounted upon pins 26 are two short arms or levers 27, provided with teeth or projections 28. The opposite ends of the levers 27 are attached, respectively, to the upper and lower ends of the levers 29 30. The lower end of the shorter lever 29 is pivotally attached to the longer 30 at or near the center thereof. The point of attachment is such as to permit the lower end of the said lever to be brought into a position parallel with the upper or shorter lever, as shown in Fig. 13, when the three points of attachment $a\ b\ c$ will lie in the same vertical plane. By this means the parts will be enabled to bear any downward thrust without displacement. A means of attachment 31 is provided upon the upper end of lever 30, to which one end of a cord is secured to enable the levers to be operated from a point clear of the course. When the levers are in the position just described, the teeth 28 project through the openings in plate 24, and the said openings, corresponding, as aforesaid, with those 23, it follows that the end bars 9, being brought together, they may be secured by the teeth 28, engaging with the said openings 23 and the gates maintained in a closed position against the pull of the rubber springs 16. When it is desired to release the gates, the cord is pulled, causing the levers to assume the position indicated by Figs. 12 and 15, when the teeth 28 are withdrawn from the openings 23, leaving the gates free to open. The movement of the levers 27 is limited in each direction, respectively, by stops 32 and the slots with which the teeth engage. The back plate 22 in addition to serving as a means for retaining the bar at the end of the right-hand gate in such a position that the surfaces of both bars are flush, insuring the proper working of the releasing device, greatly facilitates the positioning of the parts to be connected. As it is found in practice that the pull of the springs always causes the line of the gates when arranged transversely of the course to be somewhat deflected, as shown in Fig. 2, it is necessary that some means be provided so that the front of the gates may be in a straight line. This I effect by means of the devices 33 34, formed of metal and provided at their turned-over ends 35 with squared portions adapted to engage with suitable holes formed in the projections 36, Figs. 14, 15, 16, 17. The devices 33 34 are perforated at suitable intervals, and through such perforations are passed cords or the like 37. (Shown by dotted lines in Fig. 1 and in full in Fig. 2.) The tapes, cords, or the like may be threaded after the manner previously described and attached to the spindle 4, so that their adjustment may be effected simultaneously with that of the tapes 7.

38 38 are posts arranged at the side of the course, as shown by Figs. 1 and 2, and provided with horizontal arms 39, to which are pivotally attached the curved plates 40. (See Figs. 6, 7, and 8.) The arms 39 are at such a height upon the posts and so spaced as to enable the plates 40 to engage with the actuating-cords when the gates fly open and prevent them from rebounding, so as to impede the competitors in the race.

The cables 16 are constantly under tension by means of the springs to which they are attached, and these cables are also attached to the upper portion of the gate, as by the hooks 15, and are laced through hooks 17, carried by the upper portions of the posts 19. Hence the quick action of the spring when the gates are released will quickly open them and also prevent them from sagging to the ground, and when the gates are against the posts they will be held in the elevated position by the pulling influence of the spring.

The plates 40 are provided with projections 41, (see Figs. 6, 7, and 8,) which are normally caused under the action of the spring 42 to engage with the upper and lower edges of the respective arms 39, thus allowing the plates to yield as the spring passes thereover and causing them to instantly assume a more or less vertical position ready to catch the spring when the gate rebounds. When in use, the two gates are pulled forward against the springs and the end bars are secured together by means of the locking device. If necessary, the tension of the tapes may now be adjusted so as to avoid any sag. At a given signal the locking device is released, and under the action of the springs the gates fly apart, their motion being checked when fully opened and the rebound consequent upon the sudden stoppage of their movement prevented by the device provided for the purpose.

Instead of employing the rubber springs 16 for actuating the gates I may employ the devices illustrated by Figs. 18, 19. 43 is a case or barrel provided upon its under side with an extension 44, having a collar 45, by means of which the barrel is revolubly supported in a suitable bearing formed at the end of the arm 46 of the hinged clamp 47, by means of which the whole device can be readily secured to the post 19. Within the barrel is a spring 48, one end of which, 49, is secured to the said barrel and the other, 49$^a$, is attached to the spindle 50, passing through the barrel and supported at its lower end by the extension 44. Mounted upon the upper end of the spindle 50 and secured thereto by means of the key 51 is a bobbin 52, around which is wound a strap or band 53, the ends of said band being secured respectively to the body of the bobbin and to the eye 15 upon the gate. A nut 54 is provided upon the upper end of the spindle. Formed upon the outer periphery of the barrel 43 are teeth 55, engaging with a pinion 56, secured to the arm 46 by means of the spindle 57, the upper end of the said spindle being squared, so that by means of a cranked handle the barrel may be rotated. A pawl 58 engages the pinion-teeth and prevents the barrel from rotating under the action of the spring 48.

By means of the last-described arrangemnte it is possible to adjust the spring so that the amount of tension thereon may be regulated in accordance with the length of the gate upon which it acts. Thus, supposing the spring to have been used for a gate eighty feet in length and that it is desired to apply it to a gate of fifty feet only, it is obvious that the tension of the spring must be increased to obtain the same velocity, and this is readily effected by the means illustrated.

It is obvious that the gate may be arranged for vertical movement as well as horizontal. Figs. 20 and 21 illustrate a means whereby the release of the gates may be effected by means of an electromagnet, thus enabling the opening of the gates to be effected from a distant point, if so desired. The device comprises one or more magnets 59, secured to an L-shaped plate 60. Pivotally attached to the plate is an arm or lever 61, provided with an armature 62, which when the magnet is energized is acted upon, drawing the lever into the position indicated by the dotted line, Fig. 20. The cord from the locking device is attached to the upper end of the arm 61, the movement of which releases the gates, as aforesaid. A clamp 63, similar to those previously described, may form part of the plate 60 and permit the ready attachment of the device to one of the posts 1. A projection 64 prevents the lever from falling over away from the magnet.

Referring to the alternative form of adjustment for the tapes illustrated by Figs. 22 and 23, 65 are spindles arranged transversely of the tubular end pieces 5 and to which are secured one end of the respective tapes comprising the gates. The spindles are provided at their outer ends with ratchet-wheels 66, with which engage the spring-governed pawls 67. The end of the spindle is squared at 68 in order that a key may be placed thereon in order to rotate the spindles to wind the tapes thereon. Suitable openings are provided in the tubular pieces 5, through which the tapes pass to the spindles 65.

It is obvious that various changes may be made within the purview of this invention.

Having thus described my invention, I claim—

1. An apparatus for starting races, comprising a pair of gates adapted to swing across the course, said gates being composed of flexible bands, means carried by one stile of each gate whereby to lengthen and shorten the bands, a locking device carried by the inner stiles of said gates, means for supporting said inner stiles when locked, springs disposed at suitable distances from said gates and connected therewith to instantaneously open the gates when the locking device is released, and means to release said locking device.

2. An apparatus for starting races, comprising a pair of gates adapted to swing across the course, the rails of said gates being of flexible material and adapted to be shortened and lengthened, a device carried by one stile of each gate for shortening and lengthening said rails and comprising a revoluble stem around which said rails may be wound, a locking device comprising a bolt having two tongues and carried by the inner stiles of said gates, means for upholding said gates from sagging when the gate is closed, springs disposed at a suitable distance from said gate and connected therewith to instantaneously open said gates when the locking device is released, and electromagnetic means for releasing the locking device.

3. An apparatus for starting races, comprising a pair of gates composed of flexible bands adapted to swing across the course, means for shortening and lengthening the gates, locking members carried by said gates, means for supporting said gates in their closed position, resilient means connected with said gates and adapted to instantaneously open the same when the locking device is released, and means for releasing the locking device.

4. An apparatus for starting races, comprising a pair of gates composed of flexible bands adapted to swing across the course, means for shortening and lengthening the bands, locking members carried by the inner stile of said gates, resilient means connected with said gates and adapted to instantaneously open the same when the locking device is released, means for releasing the locking device, and means for preventing the buckling of the gates.

5. An apparatus for starting races, comprising a gate having an inner and an outer stile connected by lengths of flexible band combined with a locking device for holding the gate in its closed position with the band lengths extended, a spring member located between the outer stile of the gate and the side of the course on which the inner stile is located for drawing the gate open on the release of said locking device, and means carried by one of the stiles for taking up and letting out said band lengths to thereby vary the length of the gate.

6. An apparatus for starting races, comprising a gate having an inner and an outer stile connected by lengths of flexible band combined with a locking device for holding the gate in its closed position with the band lengths thereof extended, a spring member located between the outer stile of the gate and the side of the course on which the inner stile is located for drawing the gate open on the release of said locking device, means for adjusting the tension of the spring member, and means carried by one of the stiles for taking up and letting out said band lengths to thereby vary the length of the gate.

7. An apparatus for starting races, comprising a pair of gate-sections each having an inner and an outer stile connected by lengths of flexible band combined with a locking device for holding the gate-sections in their closed position with the band lengths thereof extended, spring members located between the top and bottom of the outer stiles of the respective gate-sections and points somewhat distant along the course from the corresponding inner stiles, means for adjusting the tension of said spring members, and means carried by one of the stiles of each gate-section for taking up and letting out said band lengths to thereby vary the length of the gate.

In witness whereof I have hereunto set my hand in presence of two witnesses.

CHARLES ARTHUR CHAPMAN.

Witnesses:
  ERNEST H. KEMPE,
  A. GREVETT.